United States Patent
Ando et al.

(10) Patent No.: US 9,297,378 B2
(45) Date of Patent: Mar. 29, 2016

(54) ROTARY MACHINE AND PUMP DRIVING APPARATUS

(71) Applicants: ADVICS CO., LTD., Kariya-shi (JP); DENSO CORPORATION, Kariya-shi (JP)

(72) Inventors: Kunihito Ando, Okazaki (JP); Daishi Kato, Nagoya (JP); Yuki Nakamura, Kariya (JP); Takahiro Naganuma, Kariya (JP); Tomoaki Kawabata, Takahama (JP)

(73) Assignees: ADVICS CO., LTD., Kariya-Shi, Aichi-Ken (JP); DENSO CORPORATION, Kariya-Shi, Aichi-Ken (JP)

( * ) Notice: Subject to any disclaimer, the term of this patent is extended or adjusted under 35 U.S.C. 154(b) by 330 days.

(21) Appl. No.: 13/659,346

(22) Filed: Oct. 24, 2012

(65) Prior Publication Data
US 2013/0101448 A1 Apr. 25, 2013

(30) Foreign Application Priority Data
Oct. 24, 2011 (JP) ................................. 2011-233088

(51) Int. Cl.
*F04C 11/00* (2006.01)
*F04C 2/10* (2006.01)
(Continued)

(52) U.S. Cl.
CPC ............... *F04C 2/102* (2013.01); *F04C 11/001* (2013.01); *B60T 8/4031* (2013.01); *B60T 17/02* (2013.01); *F04C 15/0038* (2013.01)

(58) Field of Classification Search
CPC .......... F04C 2/10; F04C 2/102; F04C 11/001; F04C 15/0026; B60T 8/4031; B60T 17/02

USPC ................... 417/286, 410.3, 410.4, 426, 521; 303/10, 116.4; 418/209, 210, 215

See application file for complete search history.

(56) References Cited

U.S. PATENT DOCUMENTS 3,744,942 A * 7/1973 Mount ............................. 418/76
4,512,728 A * 4/1985 Nakano et al. ..................... 418/3
(Continued)

FOREIGN PATENT DOCUMENTS

| JP | 2001080498 A | 3/2001 |
|---|---|---|
| JP | 2006170149 A | 6/2006 |
| JP | 2008-049743 A | 3/2008 |

OTHER PUBLICATIONS

Japanese Office Action (Notification of Reasons for Refusal) dated Mar. 18, 2014, issued in corresponding Japanese Patent Application No. 2011-233088 an an English translation of the Office Action. (4 pgs).

(Continued)

*Primary Examiner* — Peter J Bertheaud
(74) *Attorney, Agent, or Firm* — Buchanan, Ingersoll & Rooney PC (57) ABSTRACT

A rotary machine includes a rotary shaft having two driving reactive force receiving parts that are displaced in an axial direction and are applied with diametrical reactive forces having different rotation phases from driving targets as normal loads; and bearings that rotatably support the rotary shaft wherein the rotary shaft is rotated at a state where the rotary shaft is supported by the bearings to drive the driving targets via the driving reactive force receiving parts, wherein the bearings are respectively provided at both axial sides of one of the two driving reactive force receiving parts, which receives a higher normal load, and wherein a leading end side of the rotary shaft more than the other of the two driving reactive force receiving part, which receive a lower normal load lower than the higher normal load, is configured as a free end.

6 Claims, 5 Drawing Sheets

(51) Int. Cl.
B60T 8/40 (2006.01)
B60T 17/02 (2006.01)
F04C 15/00 (2006.01)

(56) References Cited

U.S. PATENT DOCUMENTS

| | | | |
|---|---|---|---|
| 6,402,266 B1 | 6/2002 | Ariki et al. | |
| 7,247,005 B2 * | 7/2007 | Fuchida et al. | 417/410.3 |
| 7,530,647 B2 * | 5/2009 | Yamaguchi et al. | 303/116.4 |
| 8,678,798 B2 * | 3/2014 | Nakamura et al. | 418/104 |
| 8,684,473 B2 * | 4/2014 | Nakazawa et al. | 303/10 |
| 8,708,670 B2 * | 4/2014 | Kawabata | 417/410.4 |
| 8,747,089 B2 * | 6/2014 | Nakamura et al. | 418/104 |
| 8,827,376 B2 * | 9/2014 | Foerch et al. | 303/10 |
| 8,851,578 B2 * | 10/2014 | Kawabata et al. | 303/10 |
| 2006/0120908 A1 | 6/2006 | Ohnishi et al. | |
| 2008/0048492 A1 | 2/2008 | Sakai | |

OTHER PUBLICATIONS

First Office Action dated Oct. 10, 2015 issued by the State Intellectual Property Office of People's Republic of China in the corresponding Chinese Patent Application No. 201210409106.8 and English translation (14 pages).

* cited by examiner

ROTARY MACHINE AND PUMP DRIVING APPARATUS

CROSS-REFERENCE TO RELATED APPLICATION

This application claims priority from Japanese Patent Application No. 2011-233088 filed on Oct. 24, 2011, the entire subject matter of which is incorporated herein by reference.

TECHNICAL FIELD

This disclosure relates to a rotary machine supporting a rotary shaft by a bearing, which has two driving reactive force receiving parts having different rotary phases. For example, this disclosure is appropriate for a pump driving apparatus that drives two pumps by the same rotary shaft.

BACKGROUND

It is known that a rotary machine supporting a rotary shaft by a bearing has two driving reactive force receiving parts having different rotary phases, and a pump driving apparatus drives two pumps by the same rotary shaft. For example, JP-A-2008-49743 discloses a pump driving apparatus. According to this pump driving apparatus, suction and discharge ports of two rotary pumps are arranged with respect to a rotary shaft so that a phase difference is to be 180 degrees, and axial thicknesses of the two rotary pumps are made to be different. Accordingly, it is possible to cope with a configuration where fluid consumptions (caliper sizes) are different between a front system and a rear system, such as front and rear piping vehicle.

When the pump driving apparatus, which drives the two rotary pumps having the same discharge amount by the same rotary shaft, is applied to the vehicle in which the fluid consumptions are different between the front system and the rear system, if a motor for pump driving is rotated so as to secure a flow rate necessary for the front system, a brake fluid of an excessive flow rate is supplied to the rear system. In this case, current consumption of the motor is wasted. Therefore, according to the pump driving apparatus of JP-A-2008-49743, the axial thicknesses of the two rotary pumps are made to be different, so that the brake fluid having the flow rates necessary for the respective front and rear systems is to be supplied at the same revolution.

SUMMARY

However, in case that the axial thicknesses of the two rotary pumps are made to be different, similarly to the pump driving apparatus of JP-A-2008-49743, the discharge load of the one rotary pump having the larger axial thickness is increased so that the load applied to the bearing supporting the rotary shaft is increased, thereby reducing the lifespan of the bearing. Contrary, as described above, in case that the suction and discharge ports of two rotary pumps are arranged around the rotary shaft so that a phase difference is to be 180 degrees, the support loads of the bearing by the discharges of the respective systems are applied in an offset direction, so that it is possible to increase the lifespan of the bearing. However, when the two rotary pumps are arranged between the bearings and the bearings are arranged at both sides thereof, it is necessary to provide a support part of the rotary shaft by the bearing at a leading end side outer than the two rotary pumps. Therefore, it is not possible to sufficiently shorten the shaft.

This situation occurs not only in the pump driving apparatus of JP-A-2008-49743 but also in the other rotary machines such as a pump driving apparatus where cams for driving a plurality of piston pumps are driven by the same rotary shaft and such as an engine driving apparatus that drives cams for operating respective cylinders of an engine.

With considering the above, this disclosure provides at least a rotary machine and a pump driving apparatus having a structure capable of further shortening a shaft.

A rotary machine of this disclosure comprise: a rotary shaft having two driving reactive force receiving parts that are displaced in an axial direction and are applied with diametrical reactive forces having different rotation phases from driving targets as normal loads; and bearings that rotatably support the rotary shaft, and the rotary shaft is rotated at a state where the rotary shaft is supported by the bearings to drive the driving targets via the driving reactive force receiving parts. The bearings are respectively provided at both axial sides of one of the two driving reactive force receiving parts, which receives a higher normal load, and a leading end side of the rotary shaft more than the other of the two driving reactive force receiving part, which receive a lower normal load lower than the higher normal load, is configured as a free end.

According to the rotary machine having the above configuration, the driving reactive force receiving part receiving the lower normal load has a cantilever structure where the bearings are arranged at one side thereof, and the leading end side of the rotary shaft more than the driving reactive force receiving part receiving the lower normal load is configured as a free end. Therefore, since the leading end side more than the driving reactive force receiving part having the lower normal load is not provided with a bearing, it is possible to shorten the rotary shaft and to shorten the axial length of the whole rotary machine.

Also, since the rotation phases of the driving targets are to be different, directions of diametrical loads, which are applied from the respective driving targets to the driving reactive force receiving parts of the rotary shaft, are to be different. Therefore, compared to a configuration where the rotation phases of the respective driving targets are to be the same, it is possible to suppress a peak of vibration of the rotary shaft A pump driving apparatus of this disclosure comprises: a rotary shaft having two pump driving parts of two pumps that are displaced in an axial direction and have different discharge amounts and different rotation phases, and bearings that rotatably support the rotary shaft, and the rotary is rotated shaft at a state where the rotary shaft is supported by the bearings to drive the driving targets via the pump driving parts. The bearings are respectively provided at both axial sides of one of the two pump driving parts of the two pumps, which pump has a larger discharge amount, and the a leading end side of the rotary shaft more than the other of the two pump driving parts of the two pumps, which has a smaller discharge amount smaller than the larger discharge amount, is configured as a free end.

According to the pump driving apparatus having the above configuration, the pump driving part having the smaller discharge amount has a cantilever structure where the bearings are arranged at one side thereof, and the leading end side of the rotary shaft more than the pump driving part of the pump having the smaller discharge amount is configured as a free end. Therefore, since the leading end side more than the pump driving part of the pump having the smaller discharge amount is not provided with a bearing, it is possible to shorten the rotary shaft and to shorten the axial length of the whole pump driving apparatus.

Also, since the rotation phases of the two pumps are to be different, directions of diametrical loads, which are applied from the respective pumps to the pump driving part of the rotary shaft, are to be different. Therefore, compared to a configuration where the rotation phases of the respective pumps are made to be the same, it is possible to suppress a peak of vibration of the rotary shaft In the above-described pump driving apparatus, the two pumps are rotary pumps, one of the bearings and a seal member sealing between the two rotary pumps are arranged between the two pump driving parts, and the one of the bearings is arranged to be closer to the pump having the smaller discharge amount than the seal member.

According to the above configuration, since one of the bearings is arranged at the leading end side of the rotary shaft more than the seal member, it is possible to increase a distance between the two bearings so that it is possible to further reduce the inclination of the rotary shaft Therefore, it is possible to suppress the axis deviation between the rotary shaft and another rotary shaft for driving the rotary shaft, for example a rotary shaft of a motor, and the deviation (eccentricity) of seal members arranged around the rotary shaft from a central axis, thereby improving the sealability.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, illustrative embodiments of this disclosure will be described with reference to the accompanying drawings. In the respective illustrative embodiments, the same or equivalent parts are indicated with the same reference numerals in the drawings.

First Illustrative Embodiment

Figure 1:
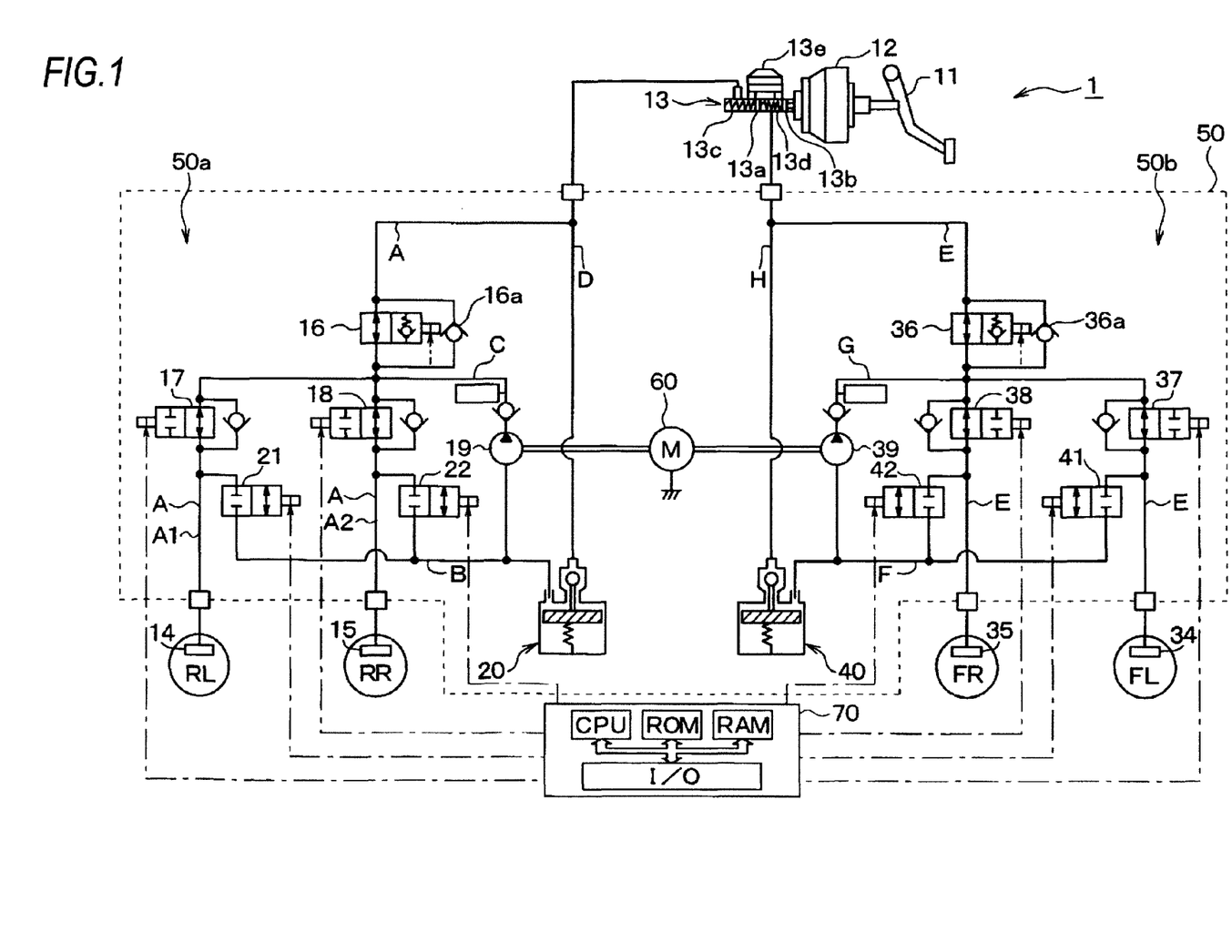
FIG. 1 is a schematic view illustrating a brake piping of a vehicle brake apparatus to which a rotary pump apparatus according to a first illustrative embodiment of this disclosure is applied.

In the below, an illustrative embodiment of this disclosure shown in the drawings will be described. FIG. 1 is a schematic view illustrating a brake piping of a brake apparatus for a vehicle to which a rotary pump apparatus according to an illustrative embodiment of this disclosure is applied. A basic configuration of the brake apparatus for a vehicle is described with reference to FIG. 1. Hereinafter, it will be described as an example that the brake apparatus for a vehicle of this disclosure is applied to a vehicle configuring a hydraulic pressure circuit of a front-rear piping.

In FIG. 1, when a driver presses a brake pedal 11 serving as a brake operating member, the pressing force is boosted by a booster apparatus 12 and master pistons 13a, 13b provided to a master cylinder (hereinafter, referred to as M/C) 13 are pressed. Thereby, an M/C pressure of the same pressure is generated in a primary chamber 13c and a secondary chamber 13d, which are divided by the master pistons 13a, 13b. The M/C pressure is transmitted to respective wheel cylinders (hereinafter, referred to as W/Cs) 14, 15, 34, 35 via an actuator 50 for brake fluid pressure control. The M/C 13 is provided with a master reservoir 13e having a passage that communicate with the primary chamber 13c and the secondary chamber 13d, respectively.

The actuator 50 for brake fluid pressure control has a first piping system 50a and a second piping system 50b. The first piping system 50a is a rear system controlling a brake fluid pressure that is applied to a right rear wheel RR and a left rear wheel RL, and the second piping system 50b is a front system controlling a brake fluid pressure that is applied to a left front wheel FL and a right front wheel FR.

Comparing the first piping system 50a and the second piping system 50b, the first piping system 50a has a larger fluid consumption (caliper capacity). However, since the configurations of the respective systems 50a, 50b are the same, only the first piping system 50a will be described in the below and the descriptions of the second piping system 50a will be omitted.

The first piping system 50a has a pipe line A being a main pipe line that transmits the M/C pressure to the W/C 14 provided to the left rear wheel RL and to the W/C 15 provided to the right rear wheel RR and generates the W/C pressure.

Also, the pipe line A has a first differential pressure control valve 16 that can be controlled between a communication state and a differential pressure state. A valve position of the first differential pressure control valve 16 is adjusted so that it is to be the communication state in a case of usual braking at which the driver operates the brake pedal 11 (in case that the vehicle motion control is not performed). When current flows in a solenoid coil of the first differential pressure control valve 16, the valve position is adjusted so that the higher differential pressure state is formed as the current value is larger.

In case that the first differential pressure control valve 16 is in the differential pressure state, the brake fluid is permitted to flow from the W/Cs 14, 15 to the M/C 13 only when the brake fluid pressures of the W/Cs 14, 15 become higher than the M/C pressure by a predetermined level or higher. Therefore, the W/Cs 14, 15 are maintained so that the pressures thereof are not higher than that of the M/C 13 by a predetermined level or higher.

The pipe line A is branched into two pipe lines A1, A2 at a side of the W/Cs 14, 15 downstream of the first differential pressure control valve 16. The pipe line A1 is provided with a first booster control valve 17 that controls a boosting of the brake fluid pressure to the W/C 14, and the pipe line A2 is provided with a second booster control valve 18 that controls a boosting of the brake fluid pressure to the W/C 15.

The first and second booster control valves 17, 18 are configured by a two-switch electromagnetic valve capable of controlling communication/cutoff states, respectively. Specifically, the first and second booster control valves 17, 18 are normally-open types in which a state is to be the communication state when control current to the solenoid coils provided to the first and second booster control valves 17, 18 becomes zero (in a non-energized state) and is to be the cutoff state when the control current is enabled to flow to the solenoid coils (in an energized state).

A pipe line B serving as a decompression pipe line, which connects a pressure-adjusting reservoir 20 and between the first and second booster control valves 17, 18 and the respective W/Cs 14, 15 on the pipe line A, is respectively provided with a first decompression control valve 21 and a second decompression control valve 22 that are respectively configured by a two-switch electromagnetic valve capable of controlling communication/cutoff states. The first and second decompression control valves 21, 22 are normally-closed types.

A pipe line C that is a back-flow pipe line is provided between the pressure-adjusting reservoir 20 and the pipe line A that is a main pipe line. The pipe line C is provided with a self-suction rotary pump 19 driven by a motor 60 that sucks and discharges the brake fluid from the pressure-adjusting reservoir 20 toward the M/C 13 or W/Cs 14, 15. The motor 60 is driven when a motor relay (not shown) is controlled.

A pipe line D that is an auxiliary pipe line is provided between the pressure-adjusting reservoir 20 and the M/C 13. Through the pipe line D, the brake fluid is sucked from the M/C 13 and discharged to the pipe line A by the pump 19. Accordingly, when the vehicle motion control is performed, the brake fluid is supplied to the W/Cs 14, 15, thereby pressurizing the W/C pressures of vehicle wheels being targets. Meanwhile, although the first piping system 50a is described, the second piping system 50b also has the same configuration. That is, the second piping system 50b has the same configurations as the respective configurations of the first piping system 50a. Specifically, the second piping system 50b has a second differential control valve 36 corresponding to the first differential pressure control valve 16, third and fourth booster control valves 37, 38 corresponding to the first and second booster control valves 17, 18, third and fourth decompression control valves 41, 42 corresponding to the first and second decompression control valves 21, 22, a pump 39 corresponding to the pump 19, a reservoir 40 corresponding to the reservoir 20 and pipe lines E to H corresponding to the pipe lines A to D. However, regarding the W/Cs 14, 15, 34, 35 to which the brake fluid is supplied by the respective systems 50a, 50b, a capacity of the second piping system 50b corresponding to the front system is larger than that of the first piping system 50a corresponding to the rear system. Thereby, it is possible to generate the higher braking force at the front side.

Also, a brake ECU (electronic control unit) 70 corresponds to a vehicle motion control device of this disclosure configuring a control system of a brake control system 1. The brake ECU 70 is configured by a well-known microcomputer having a CPU, a ROM, a RAM, an I/O and the like, executes processing such as various calculations in response to programs stored in the ROM and the like, and performs the vehicle motion control such as sideslip prevention control. That is, the brake ECU 70 calculates a variety of physical quantities, based on detections of sensors (not shown), determines whether or not to perform the vehicle motion control, based on calculation results thereof and calculates controlled variables for control target wheels, i.e., W/C pressures that are generated for the W/Cs of the control target wheels, when performing the control. Based on results thereof, the brake ECU 70 controls the current that is supplied to the respective control valves 16 to 18, 21, 22, 36 to 38, 41 and 42 and an amount of the current of the motor 60 for driving the pumps 19, 39, so that the W/C pressures of the control target wheels are controlled and the vehicle motion control is performed.

For example, when the pressure is not generated in the M/C 13, such as a case of traction control and sideslip control, the pumps 19, 39 are driven and the first and second differential pressure control valves 16, 36 are subject to the differential pressure state, so that the brake fluid is supplied to the downstream side of the first and second differential pressure control valves 16, 36, i.e., to the W/Cs 14, 15, 34, 35 through the pipe lines D, H. Then, the first to fourth booster control valves 17, 18, 37, 38 or first to fourth decompression control valves 21, 22, 41, 42 are appropriately controlled to control the boosting/decompression of the W/C pressures of the control target wheels, so that the W/C pressures become the desired controlled variables.

Also, in anti skid (ABS) control, the first to fourth booster control valves 17, 18, 37, 38 and first to fourth decompression control valves 21, 22, 41, 42 are appropriately controlled and the pumps 19, 39 are driven to thus control the boosting/decompression of the W/C pressures, so that the W/C pressures become the desired controlled variables.

Figure 2A:
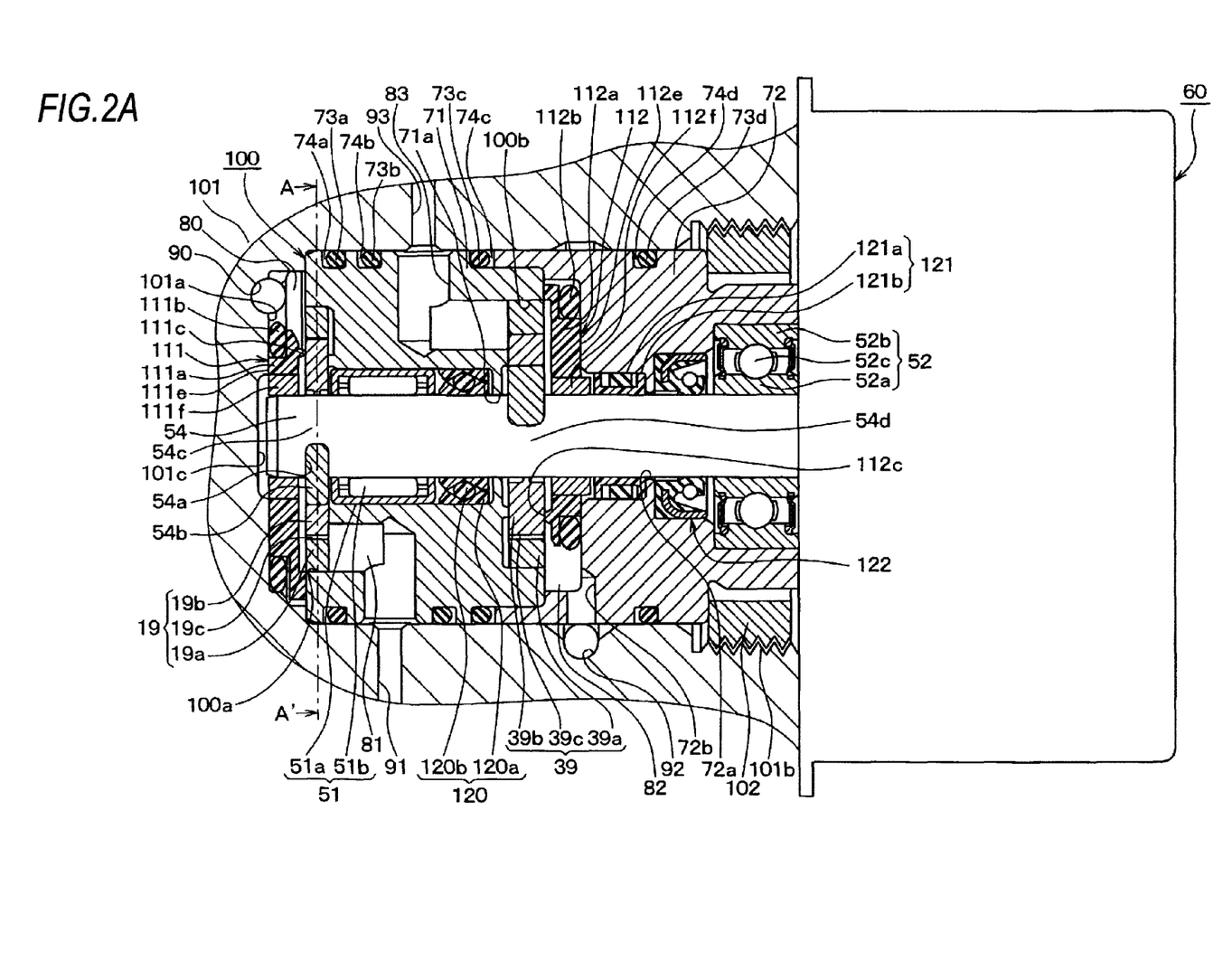
FIG. 2A is a sectional view of the rotary pump apparatus having a motor and a pump body including rotary pumps.
Figure 2B:
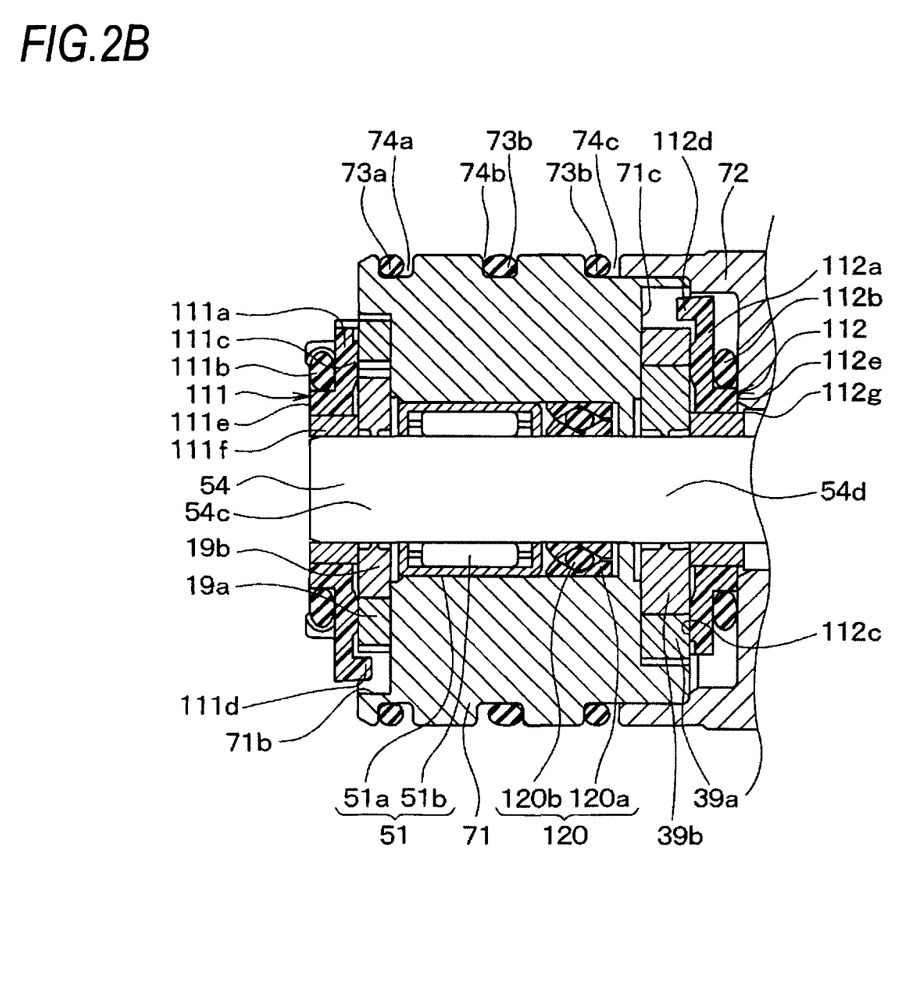
FIG. 2B is a sectional view of a leading end part of the pump body in a separate section from FIG. 2A.

In the below, a detailed structure of the rotary pump apparatus in the vehicle brake apparatus configured as described above is described. FIG. 2A is a sectional view of the rotary pump apparatus having the motor 60 and the pump body 100 including the rotary pumps 19, 39. FIG. 2A illustrates the pump body 100 mounted to a housing 101 of the actuator 50 for brake fluid pressure control. For example, the pump body is mounted so that an upper-lower direction of the drawing sheet corresponds to a vertical direction of the vehicle. Also, FIG. 2B is a sectional view of a leading end part of the pump body 100 in a different section from FIG. 2A and corresponds to a view where the pump body 100 is cut at a section perpendicular to FIG. 2A along a central axis of the pump body 100.

As described above, the vehicle brake apparatus has two systems of the first piping system 50a and the second piping system 50b. Therefore, the pump body 100 is provided with two pumps of the rotary pump 19 for the first piping system 50a and the rotary pump 39 for the second piping system 50b.

The rotary pumps 19, 39 mounted in the pump body 100 are driven as the motor 60 rotates a rotary shaft 54 that is supported by a first bearing 51 and a second bearing 52. A casing configuring an outer shape of the pump body 100 is configured by a cylinder 71 and a plug 72 made of aluminum. The first bearing 51 is arranged in the cylinder 71 and the second bearing 52 is arranged in the plug 72.

One end of the cylinder 71 is press-fitted to the plug 72 with the cylinder 71 and the plug 72 being coaxially arranged, so that they are integrated to configure the case of the pump body 100. The rotary pumps 19, 39, a variety of seal members and the like are provided together with the cylinder 71 and the plug 72, so that the pump body 100 is configured.

The pump body 100 having the integral structure is configured as described above. The pump body 100 having the integral structure is inserted into a recess part 101a having a substantially cylindrical shape formed in the housing 101 made of aluminum from a right direction in the drawing. Then, a ring-shaped male screw member (screw) 102 is screw-engaged into a female screw groove 101b formed at an entrance of the recess part 101a, so that the pump body 100 is fixed to the housing 101. By the screw engagement of the male screw member 102, the pump body 100 is prevented from falling off from the housing 101.

In the below, the direction along which the pump body 100 is inserted into the recess part 101a is simply referred to as an 'insertion direction.' Also, an axial direction and a circumferential direction of the housing 101 (an axial direction and a circumferential direction of the rotary shaft 54) are simply referred to as an axial direction and a circumferential direction.

Also, at a position corresponding to a leading end (a left end in FIGS. 2A and 2B) of the rotary shaft 54 of leading end positions at the front of the insertion direction, the recess part 101a of the housing 101 is formed with a circular second recess part 101c. A diameter of the second recess part 101c is configured so that it is larger than that of the rotary shaft 54, a leading end of the rotary shaft 54 is positioned in the second recess part 101c and the rotary shaft 54 is not contacted to the housing 101.

The cylinder 71 and the plug 72 are formed with central holes 71a, 72a, respectively. The rotary shaft 54 is inserted into the central holes 71a, 72a and is supported by the first bearing 51 fixed onto an inner periphery of the central hole 71a formed in the cylinder 71 and the second bearing 52 fixed onto an inner periphery of the central hole 72a formed in the plug 72. Regarding the first and second bearings 51, 52, bearings having any structure may be applied. In this illustrative embodiment, rolling bearings are used.

Specifically, the first bearing 51 is configured by a needle-shaped roller bearing having no inner race and has an outer race 51a and a needle-shaped roller 51b. The rotary shaft 54 is fitted into a hole of the first bearing 51 and is thus supported. Since a diameter of the central hole 71a of the cylinder 71 is enlarged to correspond to an outer diameter of the first bearing 51 at the front in the insertion direction, the first bearing 51 is press-fitted into the diameter-enlarged part and is thus fixed to the cylinder 71.

The second bearing 52 has an inner race 52a, an outer race 52b and a rolling element 52c. The second bearing is fixed to the plug 72 as the outer race 52b is press-fitted into the central hole 72a of the plug 72. The rotary shaft 54 is fitted into a hole of the inner race 52a of the second bearing 52 and is thus supported.

Figure 3:
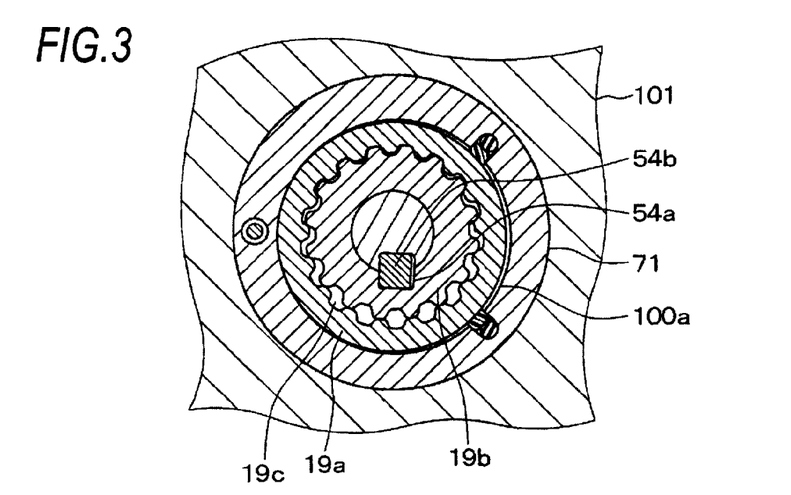
FIG. 3 is a sectional view taken along a line A-A of FIG. 2A.

The rotary pumps 19, 39 are respectively provided at both sides of the first bearing 51, i.e., an area at the front of the first bearing 51 in the insertion direction and an area positioned between the first and second bearings 51, 52. FIG. 3 is a sectional view taken along a line A-A of FIG. 2A. A detailed structure of the rotary pumps 19, 39 is described with reference to FIG. 3.

The rotary pump 19 is arranged in a rotor chamber 100a made of a counter-boring that is formed by recessing one end surface of the cylinder 71 into a circular shape, and the rotary pump 19 is configured by an internal gear pump (trochoid pump) that is driven by the rotary shaft 54 inserted into the rotary chamber 100a.

Specifically, the rotary pump 19 has a rotation part configured by an outer rotor 19a having an internal tooth part formed on an inner periphery thereof and an inner rotor 19b having an external tooth part formed on an outer periphery, and the rotary shaft 54 is inserted into a central hole of the inner rotor 19b. A key 54b is inserted into a hole 54a of the rotary shaft 54 and thus torque is transmitted to the inner rotor 19b by the key 54b.

The internal tooth part and external tooth part of the outer rotor 19a and the inner rotor 19b are engaged to thus form a plurality of void portions 19c. As the rotary shaft 54 is rotated, the void portions 19c are changed to be larger or smaller, so that the brake fluid is sucked or discharged.

In the meantime, the rotary pump 39 is arranged in a rotor chamber 100b configured by a counter-boring that is formed by recessing the other end surface of the cylinder 71 into a circular shape, the rotary pump 39 is driven by the rotary shaft 54 inserted into the rotary chamber 100b. The rotary pump 39 is configured by an internal gear pump having an outer rotor 39a and an inner rotor 39b and sucking or discharging the brake fluid by a plurality of void portions 39a that is formed by engaging of the tooth parts. The rotary pump 39 is arranged at a state where it is rotated about 180 degrees from the rotary pimp 19 around the rotary shaft 54. According to this arrangement, the void portions 19c, 39c at the suction sides of the rotary pumps 19, 39, and the void portions 19c, 39c at the discharge sides are symmetric with respect to the rotary shaft 54, so that it is possible to offset the force that the brake fluid pressure of high pressure applies to the rotary shaft 54 at the discharge side.

Basically, the rotary pumps 19, 39 have the same structure. However, the rotary pumps 19, 39 have the different thicknesses in the axial direction. Compared to the rotary pump 19 that is provided to the first piping system 50a corresponding to the rear system, the rotary pump 39 that is provided to the second piping system 50b corresponding to the front system is longer in the axial direction. Specifically, the respective rotors 39a, 39b of the rotary pump 39 are axially longer than the respective rotors 19a, 19b of the rotary pumps 19. Therefore, the rotary pump 39 can suck and discharge the more brake fluid than that of the rotary pump 19, so that it is possible to supply the more brake fluid to the front system than to the rear system.

At one end surface of the cylinder 71, a seal mechanism 111 that presses the rotary pump 19 toward the cylinder 71 is provided at an opposite side to the cylinder 71 with interposing the rotary pump 19, i.e., between the cylinder 71 the rotary pump 19 rotary pump 19 and the housing 101. Also, at the other end surface of the cylinder 71, a seal mechanism 112 that presses the rotary pump 39 toward the cylinder 71 is provided at an opposite side to the cylinder 71 with interposing the rotary pump 39, i.e., between the cylinder 71 and/or rotary pump 39 and the plug 72.

The seal mechanism 111 is configured by a ring-shaped member having a central hole into which the rotary shaft 54 is inserted, and presses the outer rotor 19a and the inner rotor 19b toward the cylinder 71 so that a relatively low-pressure part and a relatively high-pressure part of the rotary pump 19 is sealed at the one end surface. Specifically, the seal mechanism 111 has a hollow plate-shaped resin member 111a that is arranged at the rotation part side and a rubber member 111b that presses the resin member 111a toward the rotation part side.

The resin member 111a has an annular seal surface 111c that partially protrudes toward the rotary pump 19. At an inner periphery side of the annular seal surface 111c, the void portions 19c at the suction side and a gap between the outer periphery of the outer rotor 19a facing the void portions 19c at the suction side and the cylinder 71 are provided. At an outer periphery side of the seal surface 111c, the void portions 19c at the discharge side and a gap between the outer periphery of the outer rotor 19a facing the void portions 19a at the discharge side and the cylinder 71 are provided. That is, the relatively low-pressure part and the relatively high-pressure part at the inner and outer peripheries of the seal mechanism 111 are sealed by the seal surface 111c.

As can be seen from FIG. 2A, the resin member 111a is not circular and has a shape that a diametrical size thereof from the rotary shaft 54 is gradually increased from the upper part toward the lower part in the drawing. Also, the resin member 111 is provided with a rotation prevention part 111d having a projection shape. As shown in FIG. 2B, a recess part 71b is formed at a position of the cylinder 71 corresponding to the rotation prevention part 111d. The rotation prevention part 111d is press-fitted into the recess part 71b, so that the resin member 111a is prevented from being rotated as the rotary shaft 54 is rotated.

Also, an inner periphery side of a surface at the front of the resin member 111a in the insertion direction has a protrusion part 111e that protrudes toward an opposite side to the rotary pump 19, in the axial direction. The annular rubber member 111b is arranged to surround an outer periphery of the protrusion part 111e.

The annular rubber member 111b is configured by an O-ring, for example. When cutting the annular rubber member 111b in a diametrical direction, a sectional diameter is larger than a protruding amount of the protrusion part 111e. Therefore, the annular rubber member 111b is crushed between the resin member 111a and a bottom of the recess part 101a of the housing 101 and the seal surface 111c of the resin member 111a is configured to abut on the rotary pump 19 by a restoring force of the annular rubber member 111b. According to this configuration, the above seal is achieved by the seal surface 111c. Also, the annular rubber member 111b contacts the bottom of the recess part 101a of the housing 101, so that the outer periphery side and inner periphery side of the annular rubber member 111b, i.e., a discharge port 80 having high pressure and the rotary shaft 54 having low pressure are also sealed therebetween.

The resin member 111a and the annular rubber member 111b have outer diameters that are configured to be smaller than an inner diameter of the recess part 101a of the housing 101 at least at the upper part in FIG. 2A. Therefore, the brake fluid can flow via a gap between the resin member 111a and/or annular rubber member 111b and the recess part 101a of the housing 101 at the upper part in the drawing. The gap configures the discharge port 80 and is connected to a discharge pipe line 90 formed at a bottom part of the recess part 101a of the housing 101. According to this structure, the rotary pump 19 can discharge the brake fluid through the discharge port 80 and discharge pipe line 90, which serve as a discharge path.

An inner periphery side of the seal mechanism 111, i.e., a part configuring a central hole abutting on the rotary shaft 54 is configured by a metal ring 111f. The metal ring 111f is integrally molded with the resin member 111a or press-fitted into the hollow part of the resin member 111a, so that it is integrally structured with the resin member 111a. The resin member 111a is arranged with a minimum gap with the rotary shaft 54, so that it slidingly contacts the rotary shaft 54. The metal ring 111f is provided, so that the resin member 111a is prevented from directly contacting the rotary shaft 54. Therefore, even when the resin member 111a is deformed due to the brake fluid pressure generated by the rotary pump 19, it is possible to prevent the resin member 111a from tightening the rotary shaft 54 due to the deformation, i.e., to prevent the sticking of the resin member 111a.

The cylinder 71 is formed with a suction port 81 that communicates with the void portions 19c of the suction side of the rotary pump 19. The suction port 91 extends from an end surface of the cylinder 71 facing the rotary pump 19 to the outer periphery and is connected to a suction pipe line 91 provided on a side surface of the recess part 101a of the housing 101. According to this structure, the rotary pump 19 can introduce the brake fluid through the suction pipe line 91 and the suction port 81, which serve as a suction path.

In the meantime, the seal mechanism 112 is also configured by a ring-shaped member having a central hole into which the rotary shaft 54 is inserted, and seals a relatively low-pressure part and a relatively high-pressure part of the rotary pump 39 at one end surface by pressing the outer rotor 39a and the inner rotor 39b toward the cylinder 71. Specifically, the seal mechanism 112 has a structure having a hollow plate-shaped resin member 112a that is arranged at the rotation part side, a rubber member 112b that presses the resin member 112a toward the rotation part side and a metal ring 112c that is arranged at an inner periphery side of the resin member 112a. The seal mechanism 112 has a surface that is opposite to that of the seal mechanism 111 to configure a seal, and thus has a symmetrical shape with respect to the seal mechanism 111. However, the seal mechanism 112 has the same basic structure as the seal mechanism 111 and is arranged around the rotary shaft 54 so that phase difference is to be 180 degrees with respect to the seal mechanism 111.

The resin member 112a has an annular seal surface 112c that partially protrudes toward the rotary pump 39. At an inner periphery side of the annular seal surface 112c, the void portions 39c at the suction side and a gap between the outer periphery of the outer rotor 39a facing the void portions 39c at the suction side and the cylinder 71 are provided. At an outer periphery side of the seal surface 112c, the void portions 39c at the discharge side and a gap between the outer periphery of the outer rotor 39a facing the void portions 39c at the discharge side and the cylinder 71 are provided. That is, the relatively low-pressure part and the relatively high-pressure part at the inner and outer peripheries of the seal mechanism 112 are sealed by the seal surface 112c.

As can be seen from FIG. 2A, the resin member 112a is not circular and has a shape that a diametrical size thereof from the rotary shaft 54 is gradually decreased from the upper part toward the lower part in the drawing. Also, the resin member 112a is provided with a rotation prevention part 112d having a projection shape, as shown in FIG. 2B. A recess part 71c is formed at a position of the cylinder 71 corresponding to the rotation prevention part 112d. The rotation prevention part 112d is press-fitted into the recess part 71c, so that the resin member 112a is prevented from being rotated as the rotary shaft 54 is rotated.

Also, an inner periphery side of a surface at the rear of the resin member 112a in the insertion direction has a protrusion part 112e that protrudes toward an opposite side to the rotary pump 39 in the axial direction. The annular rubber member 112b is arranged to surround an outer periphery of the protrusion part 112e.

The annular rubber member 112b is configured by an O-ring, for example. When cutting the annular rubber member 112b in the diametrical direction, a sectional diameter is larger than a protruding amount of the protrusion part 112e. Therefore, the annular rubber member 112b is crushed between the resin member 112a and the plug 72 and the seal surface 112c of the resin member 112a is configured to abut on the rotary pump 39 by a restoring force of the annular rubber member 112b. According to this configuration, the above seal is achieved by the seal surface 112c. Also, the annular rubber member 112b contacts the recess part of the plug 72, so that the outer periphery side and inner periphery side of the annular rubber member 112b, i.e., a discharge port 82 of high pressure and the rotary shaft 54 of low pressure are also sealed therebetween.

The resin member 112a and the annular rubber member 112b have outer diameters that are configured to be smaller than an inner diameter of the plug 72 at least at the lower part in the drawing. Therefore, the brake fluid can flow through a gap between the resin member 112a and/or annular rubber member 112b and the plug 72 at the lower part in the drawing. The gap configures the discharge port 82 and is connected to a communication path 72b formed in the plug 72 and a discharge pipe line 92 formed on a side surface of the recess part 101a of the housing 101. According to this structure, the rotary pump 39 can discharge the brake fluid through the discharge port 82, the communication path 72*b* and the discharge pipe line 92, which serve as a discharge path.

An inner periphery side of the seal mechanism 112, i.e., a part configuring a central hole abutting on the rotary shaft 54 is configured by a metal ring 112*f*. The metal ring 112*f* is integrally molded with the resin member 112*a* or press-fitted into the hollow part of the resin member 112*a*, so that it is integrally structured with the resin member 112*a*. The metal ring 112*f* is provided, so that the resin member 112*a* is prevented from directly contacting the rotary shaft 54. Therefore, even when the resin member 112*a* is deformed due to the brake fluid pressure generated by the rotary pump 39, it is possible to prevent the resin member 112*a* from tightening the rotary shaft 54 due to the deformation, i.e., to prevent the sticking of the resin member 112*a*.

In the meantime, the end surface of the cylinder 71 facing the rotary pumps 19, 39 is also a seal surface and the rotary pumps 19, 39 are closely contacted to the seal surface, so that a mechanical seal is achieved and thus the relatively low-pressure part and the relatively high-pressure part of the rotary pumps 19, 39 at the other end surface side are sealed.

Also, the cylinder 71 is formed with a suction port 83 that communicates with the void portions 39*c* of the suction side of the rotary pump 39. The suction port 83 extends from an end surface of the cylinder 71 facing the rotary pump 39 to the outer periphery and is connected to a suction pipe line 93 provided on a side surface of the recess part 101*a* of the housing 101. According to this structure, the rotary pump 39 can introduce the brake fluid through the suction pipe line 93 and the suction port 83, which serve as a suction path.

Meanwhile, in FIG. 2A, the suction pipe line 91 and the discharge pipe line 90 correspond to the pipe line C in FIG. 1 and the suction pipe line 93 and the discharge pipe line 92 correspond to the pipe line G in FIG. 1.

Also, a seal member 120 configured by an annular seal member 120*a* having a U-shaped section in the diametrical direction and an annular rubber member 120*b* fitted into the annular resin member 120*a* is accommodated in the central hole 71*a* of the cylinder 71 at the rear of the first bearing 51 in the insertion direction. As the annular resin member 120*a* is pressed by the cylinder 71 and the rotary shaft 54, the annular rubber member 120*b* is crushed and the annular resin member 120*a* is contacted to the cylinder 71 and the rotary shaft 54 by an elastic reactive force of the annular rubber member 120*b*, so that the seal member 120 seals the cylinder and the rotary shaft therebetween. Therefore, the seal is achieved between the two systems in the central hole 71*a* of the cylinder 71.

Also, the central hole 72*a* of the plug 72 has a stepped shape that the inner diameter thereof is changed in three steps from the front to the rear in the insertion direction, and the seal member 121 is accommodated in the first stepped portion at the most rearward side in the insertion direction. The seal member 121 is formed by fitting a ring-shaped elastic ring 121*a*, which is made of an elastic member such as rubber, into a ring-shaped resin member 121*b* having a groove portion, in which depth direction is the diametrical direction, and the resin member 121*b* is pressed by the elastic force of the elastic ring 121*a*, so that the seal member contacts the rotary shaft 54.

In the meantime, the seal mechanism 112 is accommodated in the second stepped portion of the central hole 72*a*, which is a next step to the first step in which the seal member 121 is arranged. The communication path 72*b* is formed to extend from the stepped portion to the outer peripheral surface of the plug 72. Also, an end portion of the cylinder 71 at the rear side in the insertion direction is press-fitted into the third stepped portion positioned at the most forward side of the central hole 72*a* in the insertion direction. A part of the cylinder 71 press-fitted into the central hole 72*a* of the plug 72 has an outer diameter that is reduced to be smaller than the other part of the cylinder 71. An axial size of the outer diameter-reduced part of the cylinder 71 is larger than an axial size of the third stepped portion of the central hole 72*a*. Therefore, when the cylinder 71 is press-fitted into the central hole 72*a* of the plug 72, a groove portion 74*c* is formed by the cylinder 71 and the plug 72 at the leading end portion of the plug 72.

Also, the diameter of the central hole 72*a* of the plug 72 is also partially enlarged at the rear in the insertion direction, and an oil seal (seal member) 122 is arranged in the diameter-enlarged part. Like this, the oil seal 122 is arranged at the closer side to the motor 60 than the seal member 121, so that the brake fluid leakage to the outside through the central hole 72*a* is prevented by the seal member 121 and the sealing effect is obtained more securely by the oil seal 122.

On the outer periphery of the pump body 100 configured as described above, O-rings 73*a* to 73*d* serving as the annular seal member are provided to seal the respective parts. The O-rings 73*a* to 73*d* seal the brake fluid between the two systems formed in the housing 101 and the discharge path and the suction path of each system. The O-ring 73*a* is arranged between the discharge port 80 and/or a discharge pipe line 90 and the suction port 81 and/or suction pipe line 91, the O-ring 73*b* is arranged between the suction port 81 and/or suction pipe line 91 and the suction port 83 and/or suction pipe line 93, the O-ring 73*c* is arranged between the suction port 83 and suction pipe line 93 and the discharge port 82 and/or discharge pipe line 93 and the O-ring 73*d* is arranged between the discharge port 82 and/or discharge pipe line 92 and the outside of the housing 101. The O-rings 73*a*, 73*c*, 73*d* are arranged in a circular shape so that they surround the rotary shaft 54 in the circumferential direction by one round, and the O-ring 73*b* surrounds the rotary shaft 54 in the circumferential direction and is axially displaced, so that it is possible to reduce the axial size of the rotary shaft 54.

In the meantime, the outer periphery of the pump body 100 is formed with groove portions 74*a* to 74*d* so that the O-rings 73*a* to 73*d* is arranged therein. The groove portions 74*a*, 74*b* are formed by partially recessing the outer periphery of the cylinder 71. The groove portion 74*c* is formed by a recessed portion on the outer periphery of the cylinder 71 and the leading end portion of the plug 72. The groove portion 74*d* is formed by partially recessing the outer periphery of the plug 72. When the pump body 100 is inserted into the recess part 101*a* of the housing 101 with the O-rings 73*a* to 73*d* being fitted into the groove portions 74*a* to 74*d*, the respective O-rings 73*a* to 73*d* are crushed onto an inner wall surface of the recess part 101*a*, thereby serving as the seals.

Also, the diameter of the outer peripheral surface of the plug 72 is reduced at the rear part in the insertion direction, thereby configuring a stepped portion. The ring-shaped male screw member 102 is fitted into the diameter-reduced part, so that the pump body 100 is fixed.

The rotary pump apparatus is configured as described above. According to the rotary pump apparatus configured as described above, the rotary shaft 54 of the embedded rotary pumps 19, 39 is rotated by the rotary shaft of the motor 60, so that the pump operation of sucking and discharging the brake fluid is performed. Accordingly, the vehicle motion control such as anti skid control is made by the vehicle brake apparatus.

Also, according to the rotary pump apparatus, when performing the pump operation, the discharge pressures of the rotary pumps 19, 39 are introduced to the opposite sides of the resin members 111*a*, 112*a* of both seal mechanisms 111, 112 to the rotary pumps 19, 39. Therefore, the discharge pressures of high pressure are applied in the direction of pressing both seal mechanisms 111, 112 from the outside of the cylinder 71, so that the seal surfaces 111c, 112c of both seal mechanisms 111, 112 are pressured to the rotary pumps 19, 39 and the axial other end surfaces of the rotary pumps 19, 39 are pressured to the cylinder 71. Accordingly, while sealing the axial one end surfaces of the rotary pumps 19, 39 by both seal mechanisms 111, 112, it is possible to mechanically seal the axial other end surfaces of the rotary pumps 19, 39 by the cylinder 71.

According to the rotary pump apparatus having the above configuration, a rotation driving part 54d of the rotary shaft 54, which drives the rotary pump 39, has a double-supported structure where the bearings 51, 52 are arranged at both sides thereof, and a rotation driving part 54c, which drives the rotary pump 19, has a cantilever structure where the bearings 51, 52 are arranged at one side thereof. A leading end side (left side in FIGS. 2A and 2B) of the rotary shaft 54 more than the rotary pump 19 is a free end. Therefore, since the leading end side more than the rotation driving part 54c of the rotary pump 19 is not provided with a bearing, it is possible to shorten the rotary shaft 54 and to shorten the axial length of the whole rotary pump apparatus.

Also, according to the rotary pump apparatus having the above configuration, since the higher diametrical load is applied to the rotary shaft 54 at a side of the rotation driving part 54d of the rotary pump 39 having the larger discharge amount of the brake fluid than a side of the rotation driving part 54c of the rotary pump 19 having the smaller discharge amount, the normal load is increased at the side of the rotation driving part 54d of the rotary pump 39 and is decreased at the side of the rotation driving part 54c of the rotary pump 19. Therefore, according to the rotary pump apparatus of this illustrative embodiment, the rotation driving part 54d of the rotary pump 39, at which the normal load is increased, is supported at both sides by the bearings 51, 52.

For example, when the bearings are arranged at both sides of the rotary pump having the lower normal load, the bearing arranged between both rotary pumps is applied with the higher radial load from the rotary shaft. Compared to this, when the bearings 51, 52 are arranged at both sides of the rotary pump 39 having the higher normal load, like this illustrative embodiment, it is possible to reduce the radial load of the bearing. Therefore, it is possible to extend the lifespan of the bearing 51 arranged between both the rotary pumps 19, 39.

In particular, since the rotary pumps 19, 39 that are the driving targets are arranged at both axial sides of the bearing 51 arranged between both the rotary pumps 19, 39, it is required that the bearing 51 should have the longer lifespan, due to the difficulty in maintenance, compared to the bearing 52 positioned at the more rearward end side of the rotary shaft 54 than the rotary pump 39. In the standpoint of the maintenance, extending of the lifespan of the bearing 51 is effective.

Also, according to the rotary pump apparatus of this illustrative embodiment, since the rotation phases of the respective rotary pumps 19, 39 are to be different, the directions of the diametrical loads, which are applied from the respective rotary pumps 19, 39 to the rotation driving parts 54c, 54d of the rotary shaft 54, are to be different. Therefore, compared to a configuration where the rotation phases of the respective rotary pumps 19, 39 are to be the same, it is possible to suppress a peak of the vibration of the rotary shaft 54. Particularly, when the rotation phases of the respective rotary pumps 19, 39 have the phase difference of 180 degrees, like this illustrative embodiment, the directions of the diametrical loads, which are applied from the respective rotary pumps 19, 39 to the rotation driving parts 54c, 54d, is to be opposite to each other. Thus, it is possible to offset the loads to be applied to the rotary shaft 54, thereby most reducing the same. Thereby, it is possible to further suppress the peak of the vibration of the rotary shaft 54.

Figure 4A:
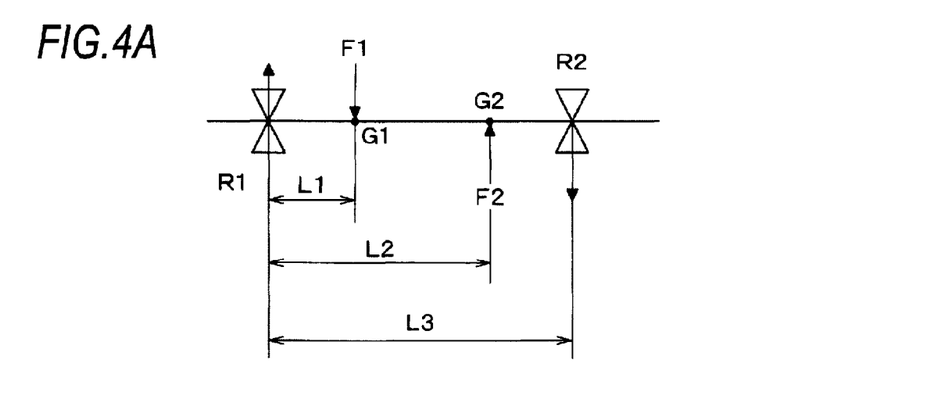
FIGS. 4A and 4B illustrate a relation between loads applied to a rotary shaft of the rotary pump apparatus and support positions in the background art and the illustrative embodiment.
Figure 4B:
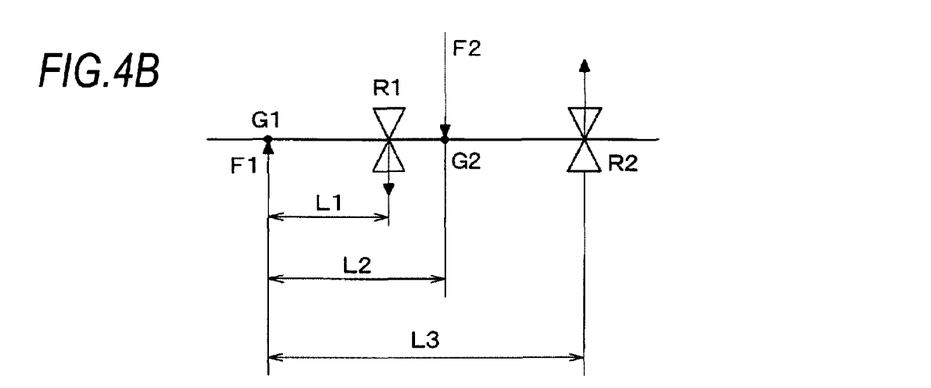

Also, like the rotary pump apparatus of this illustrative embodiment, when the rotary pump 39 in which the normal load is increased has the double-supported structure where both sides thereof are supported by the bearings 51, 52 and the rotary pump 19 has the cantilever structure where one side thereof is supported by the bearings 51, 52, it is possible to further reduce the load that is applied to the bearing 51 and to further reduce the length. The test result will be described with reference to FIGS. 4 and 5 as the below.

Figure 5:
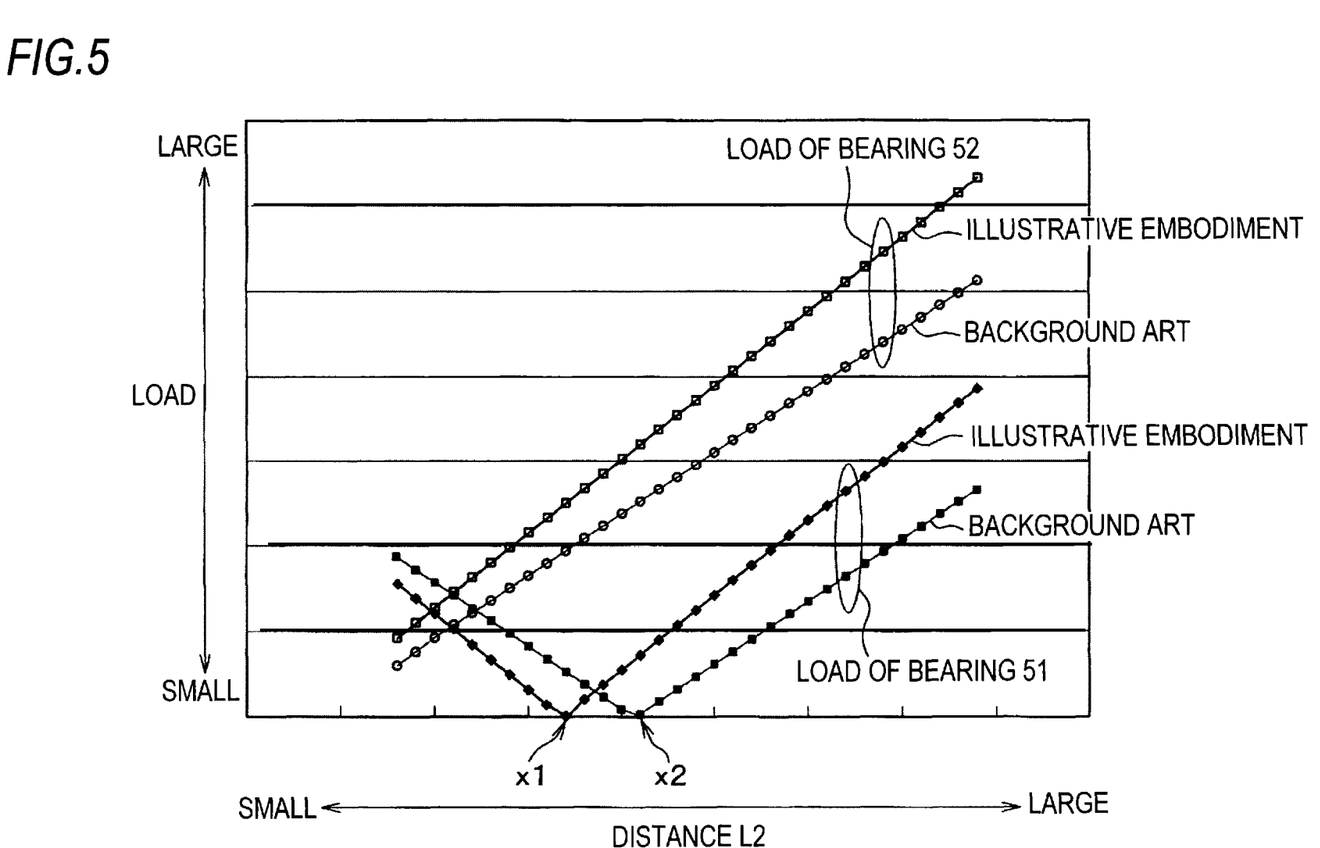
FIG. 5 is a graph illustrating changes in absolute values of loads that are applied to both bearings, according to positions of a pump driving part driving the rotary pump.

FIGS. 4A and 4B are views illustrating between loads applied to a rotary shaft 54 of the rotary pump apparatus and support positions in the background art and the illustrative embodiment. FIG. 5 is a graph illustrating changes in absolute values of the loads that are applied to both bearings 51, 52, according to positions of the rotation driving part 54d of the rotary shaft 54, which drives the rotary pump 39, is changed. Meanwhile, in FIG. 5, L2 and load is 0 (zero) at an intersection point (original point) at the left-lower of the coordinates. In the respective coordinates, each scale is equally spaced and has the same numerical width (in other words, a direct proportional relation is shown with a line in the graph).

In FIG. 4, R1 indicates a support point at the bearing 51 positioned at the leading end side of the rotary shaft 54, R2 indicates a support point at the bearing 51 positioned at the rear end side (motor side) of the rotary shaft 54 and F1 and F2 indicate the loads that are applied to positions G1, G2 of the rotation driving parts 54c, 54d of the respective rotary pumps 19, 39 positioned at the leading end side and rear end side of the rotary shaft 54. In the rotary pump apparatus of the background art as shown in FIG. 4A, a distance from the support point R1 to the position G1 is L1, a distance from the support point R1 to the position G2 is L2, and a distance from the support point R1 to the support point R2 is L3. Also, in the rotary pump apparatus of this illustrative embodiment shown in FIG. 4B, a distance from the position G1 to the support point R1 is L1, a distance from the position G1 to the position G2 is L2, and a distance from the position G1 to the support point R2 is L3.

When the distances L1, L3 are fixed and the position of the rotary pump 39 positioned at the rear end side of the rotary shaft 54 is changed to change the distance L2, the loads that are applied to the respective bearings 51, 52 are changed as shown in the result of FIG. 5.

In the bearing 52 positioned at the rear end side of the rotary shaft 54, as the distance L2 is larger, the load to be applied is larger. The reason is as follows: since the rotary pump 39 positioned at the rear end side of the rotary shaft 54 is close to the bearing 52 positioned at the rear end side of the rotary shaft 54, a proportion of the load, which is applied from the rotary pump 39 positioned at the rear end side of the rotary shaft 54, to be supported by the bearing 52 is increased. The load is continuously increased as the distance L2 is changed. This is the same in both rotary pump apparatuses according to the background art and the illustrative embodiment.

On the other hand, in the bearing 51 positioned at the leading end side of the rotary shaft 54, as the distance L2 is increased, the load to be applied is decreased, the load becomes the minimum (zero) at a point (the distance L2 is a position of a point x2 in the background art, and the distance L2 is a position of a point x1 in this illustrative embodiment)

and the direction of the load is changed on the basis of the point and then is increased. The reason is as follows: since the loads that are applied from the two rotary pumps 19, 39 arranged so that the rotation phase difference is to be 180 degrees and the rotary shaft 54 are offset each other, the load becomes the minimum at a balanced position of the loads and the load is changed at the balanced position and applied.

With considering the point at which the load becomes the minimum, the distance L2 is a position of the point x2 in the background art and the distance L2 is a position of the point x1 in this illustrative embodiment. In this illustrative embodiment, the load becomes the minimum when the distance L2 is shortened. Accordingly, it can be seen that the structure of this illustrative embodiment is possible to shorten the rotary shaft 54 to reduce the load to be applied to the bearing 51 and to shorten the axial length of the rotary pump apparatus and extend the lifespan of the bearing 51.

In the meantime, according to the rotary pump apparatus of this illustrative embodiment, the bearing 51 and the seal member 120 are arranged side by side in the axial direction of the rotary shaft 54, and the bearing 51 is arranged at the forward side of the rotary shaft 54 more than the seal member 120. The arrangement is arbitrary. That is, the seal member 120 may be arranged at the forward side of the rotary shaft 54 more than the bearing 51.

However, when the bearing 51 is arranged at the forward side of the rotary shaft 54 more than the seal member 120, it is possible to increase the distance between the bearing 51 and the bearing 52, so that it is possible to further reduce the inclination of the rotary shaft 54. Therefore, it is possible to suppress the axis deviation between the rotary shaft 54 and the rotary shaft of the motor 60 and the deviation (eccentricity) of the seal members 120, 121 or oil seal 122 from the central axis, thereby improving the sealability.

Other Illustrative Embodiments

In the above illustrative embodiment, the rotary pump apparatus that is an example of the pump driving apparatus has been exemplified as the rotary machine. However, this disclosure is also applied to the other pump driving apparatuses or other rotary machines. The other pump driving apparatuses may include a pump driving apparatus that drives cams for driving a plurality of piston pumps by the same rotary shaft. In the above illustrative embodiment, since the rotary pump apparatus has been exemplified, the rotation driving parts 54c, 54d of the rotary shaft 54 relating to the rotary pumps 19, 39 are corresponding to the pump driving parts. However, for the pump driving apparatus that drives cams for driving a plurality of piston pumps by the same rotary shaft, the cams for driving are corresponding to the pump driving parts. Also, the other rotary machines may include an engine driving apparatus that drives cams of operating respective cylinders of an engine. As described above, when this disclosure is applied to the pump driving apparatus, the pump driving parts are corresponding to the driving reactive force receiving parts. However, when this disclosure is applied to the engine driving apparatus, the cams that operate the respective cylinders of an engine are corresponding to the driving reactive force receiving parts.

Also, in the above illustrative embodiment, the pump driving apparatus having the rotation driving parts 54c, 54d of the two rotary pumps 19, 39, i.e., two driving reactive force receiving parts has been exemplified. However, this disclosure can be also applied to a rotary machine having at least two driving reactive force receiving parts, and thus may be applied to a rotary machine having three or more driving reactive force receiving parts.

Also, in the above illustrative embodiment, the rotation phases of the respective rotary pumps 19, 39 have the phase difference of 180 degrees. When the two rotary pumps 19, 39 are provided, the angle, which can most reduce the load to be applied to the rotary shaft 54, is 180 degrees and the phase difference of the rotation phases may be an angle other than 180 degrees. Specifically, when the number of the driving reactive force receiving parts is three or larger, it is preferable that the rotation phases of the respective driving reactive force receiving parts are displaced so as to offset the loads to be applied to the rotary shaft from the respective driving reactive force receiving parts, depending on the number of the driving reactive force receiving parts.

What is claimed is:

1. A pump driving apparatus comprising:
    a motor;
    a rotary shaft connected to the motor;
    a first pump driving part of a first pump, the first pump driving part arranged on the rotary shaft;
    a second pump driving part of a second pump, the second pump driving part arranged on the rotary shaft;
    the first and second pump driving parts being spaced in an axial direction relative to one another and having different rotation phases;
    a first bearing and a second bearing, the first and second bearings rotatably supporting the rotary shaft;
    a cylinder member having a pair of opposed end faces in sealing contact with the first pump and the second pump, respectively;
    suction ports provided in the cylinder member in communication with void portions at discharge sides of the first pump and the second pump;
    wherein the rotary shaft is rotated at a state where the rotary shaft is supported by the first bearing and the second bearing to drive driving targets via the first pump driving part and the second pump driving part;
    wherein the first bearing, the first pump driving part, the second bearing and the second pump driving part are arranged along the rotary shaft in that order from a first side of the rotary shaft connected to the motor to a second side of the rotary shaft;
    wherein a discharge amount of the first pump is larger than a discharge amount of the second pump;
    wherein the first and second pumps are rotary pumps;
    wherein a seal member is arranged between the first and second pump driving parts in contact with the rotary shaft, the seal member providing a seal between the first and second rotary pumps; and
    wherein the seal member and the second bearing are arranged in a space between the cylinder member and the rotary shaft.

2. The pump driving apparatus according to claim 1, wherein the second bearing is closer to the second pump than the seal member is to the second pump.

3. The pump driving apparatus according to claim 1, wherein a thickness of the first pump in an axial direction of the rotary shaft is greater than a thickness of the second pump in the axial direction of the rotary shaft.

4. The pump driving apparatus according to claim 1, wherein the second bearing is in axial contact with the seal member.

5. The pump driving apparatus according to claim 1, wherein the void portion at the discharge side of the first pump is symmetrical to the void portion at the discharge side of the second pump, with respect to the rotary shaft.

6. A pump driving apparatus comprising:
a case;
a motor;
a rotary shaft connected to the motor;
a first pump driving part of a first pump, the first pump driving part arranged on the rotary shaft;
a second pump driving part of a second pump, the second pump driving part arranged on the rotary shaft;
the first and second pump driving parts being spaced in an axial direction relative to one another and having different rotation phases;
a first bearing and a second bearing, the first and second bearings rotatably supporting the rotary shaft;
wherein the rotary shaft is rotated at a state where the rotary shaft is supported by the first bearing and the second bearing to drive driving targets via the first pump driving part and the second pump driving part;
wherein the first bearing, the first pump driving part, the second bearing and the second pump driving part are arranged along the rotary shaft in that order from a first side of the rotary shaft connected to the motor to a second side of the rotary shaft;
wherein a discharge amount of the first pump is larger than a discharge amount of the second pump;
wherein an annular cavity is defined between an outer surface of the shaft and an inner surface of the case;
wherein the second bearing and a first seal member are both disposed in the annular cavity;
wherein the pump driving apparatus further includes a housing;
wherein the case is disposed in the housing; and
wherein a second seal member is disposed between the housing and the case.

* * * * *